United States Patent [19]

Fair

[11] 4,232,437
[45] Nov. 11, 1980

[54] METHOD FOR RECONDITIONING AN ENGINE HEAD

[75] Inventor: James V. Fair, Tucson, Ariz.

[73] Assignee: V & W Parts & Machine Shops, Inc., Tucson, Ariz.

[21] Appl. No.: 920,964

[22] Filed: Jun. 30, 1978

[51] Int. Cl.³ .................. B23P 15/00; B23P 13/00; F01L 1/04
[52] U.S. Cl. .................. 29/156.4 R; 29/402.06; 29/402.11; 123/90.27; 123/90.31; 123/90.44
[58] Field of Search ......... 29/156.4 R, 401 R, 401.06, 29/401.11; 123/90.27, 90.31, 90.44, 90.1, 90.6

[56] References Cited

U.S. PATENT DOCUMENTS

| | | | |
|---|---|---|---|
| 2,186,259 | 1/1940 | McNeil | 123/90.27 |
| 3,482,553 | 12/1969 | Buchwald | 123/90.27 |
| 3,711,927 | 1/1973 | Davidson | 29/401 |

FOREIGN PATENT DOCUMENTS 1260864  2/1968  Fed. Rep. of Germany ........ 123/90.27

*Primary Examiner*—Daniel C. Crane
*Attorney, Agent, or Firm*—J. Michael McClanahan

[57] ABSTRACT

Means and method for reconditioning engines of the type having a head mounted cam shaft tower holding a cam shaft where the engine head has been damaged by warpage, the invention comprising a shim means for reconditioning the engine and a method for machining the top and the bottom of the engine head to obtain planar parallel surfaces, selecting the thickness of shims to generally correspond with the total thickness of the metal removed from both surfaces of the head, and installing the shims between the cam shaft towers and the head in order that the cam shaft be located at relatively the same fixed distance from the engine block as that in the engine prior to reconditioning.

2 Claims, 4 Drawing Figures

METHOD FOR RECONDITIONING AN ENGINE HEAD

BACKGROUND OF THE INVENTION

It is a common problem in engines which have flat heads, and more particularly, flat aluminum heads, that overheating of the engine results in substantial warpage of the head rendering the engine unfit for usuage. When a head warps, it generally bows in the longest direction. This bowing usually takes the form of a convex bow of the head (when looking down upon the engine) and, because of the construction and the relative thickness of metal in the head, both the top and the bottom surface of the head which joins the engine block, bows or warps.

In these cases, the common practice is to discard the head and to reinstall a new head. There have however, been attempts to salvage the warped head by planing or milling the lower surface of the head to a flat surface in order to re-join in sealing relationship to the engine block. In these cases where the head bottom side is milled, and reassembled on the engine block, the problem still remains that the top of the head is still warped. As a consequence and in those cases where an overhead cam shaft is located on top of the head and then reinstalled in place, the cam bearings which are held in cam towers attached to the top of the head are no longer in straight alignment, but in fact continue the bow. This of course was the condition before the head was removed and after the head had originally been warped. The results of this non-alignment of the cam shaft bearing is to eventually, by excess pressure placed on different points of the cam shaft, to break the cam shaft or excessively wear the cam bearings so that the engine is rendered inoperable.

It is noted that even in referring to the manufacturer's official engine shop manuals for automobiles, that repairs of the engines for warped heads either takes the form of replacing the head or to mill and surface the lower surface of the head which comes into contact with the engine block.

Some mechanics and machine shops have learned, through experience, that indeed you must machine and prepare the surface of both the top and the bottom of the engine head if the same head having overhead cam shaft is to be placed back upon the block. However, in accomplishing this partially correct solution, an additional problem develops, which problem is remedied by the present invention.

When both the top and the bottom surfaces of the head are machined for flatness and parallel surfaces, this usually results in removing a considerable amount of metal, commonly a total exceeding 15/1000 to 20/1000 of an inch. In a great number of engines having the overhead cam shafts, the cam shaft rests upon cam towers, metal blocks which are attached to the top of the head and in which are secured the cam bearings. If the cam towers are replaced upon the head where an excess of 15/1000 inch of metal has been removed, the result is to bring the cam shaft chain sprocket closer to the chain sprocket attached to the engine crankshaft. Most engines have mechanisms in a form of idlers or other types of friction devices to adjust for slack in the timing chain connecting these two sprockets, however, it has proven to be the case in many engines that there is not sufficient adjustment to correct excess slack where the cam shaft sprocket and the crankshaft sprocket have been moved closer than 15/1000 inch from the original manufacturer's specification. As a result, rebuilding an engine after taking off an excess of 15/1000 inch total on both surfaces of the head results in excessive slackness in the timing chain and inability to achieve proper clearance between the valve stem ends and valve rockers.

Commonly then, at least 80% of the machine shops doing engine repair business will inform the owner of the engine that in the case of moderate to severe warped engine heads, that repairs cannot be made upon the head and that it is necessary that a new head be placed upon the engine block.

It is the rectification of this problem to which the present invention is directed.

SUMMARY OF THE INVENTION

In accordance with the present invention, a means and method is provided whereby it is no longer necessary to discard moderate and severely warped heads in engines of the type having overhead cam shafts but, in fact, these heads may be reconditioned and reinstalled on the engine block. Specifically, the invention comprises the addition of metal shims of specified thickness which singly, or in combination, are placed between the top of the engine head and the bottom of the cam tower. The shims are designed to accommodate cam tower securing bolts which extend into the engine head, and the oil passageways which provide lubricating oil from the engine block through the engine head and into internal passageways in the cam tower to lubricate the cam shaft bearings secured therein.

Accordingly it is an object of the present invention to provide a means and method whereby engines of the type that have overhead cam shafts and which have suffered moderate and severely warped heads may be reconditioned and placed back in service.

Accordingly, it is an object of the present invention to provide a means whereby heretofore discarded warped engine heads may be reconditioned and reused.

It is a further object of the present invention to provide a means whereby excess slack in the timing chain connecting the cam shaft sprocket and the crankshaft sprocket may be taken up after the engine head has been machined to avoid a warped surface.

DETAILED DESCRIPTION OF PREFERRED EMBODIMENT

Figure 1:
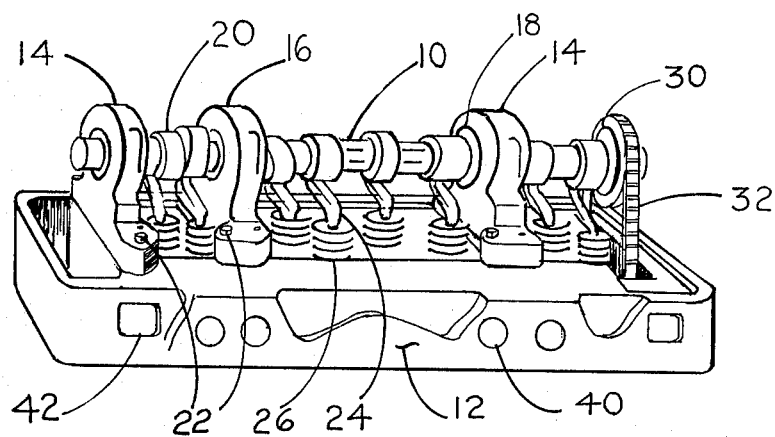
FIG. 1 is a perspective view of a typical engine head with the cam shaft mounted thereon.

FIG. 1 shows a perspective view of a head on a typical engine having an overhead cam shaft. More specifically and with reference to the drawing shown in FIG. 1, the cam shaft 10 is shown extending lengthwise along the length of head 12 supported by cam towers 14 and central cam tower 16. Cam shaft bearings 18, of which there are at least one in each cam tower, directly support the cam shaft 10 at each cam tower. The cam towers are secured at their respective bases by means of securing bolts which penetrate the base of the cam tower to screw into tapped holes (not shown) in head 12. Shown for illustrative purposes are cam lobes 20 which are a part of cam shaft 10.

For a short background of the function of the cam shaft, it can be stated that the rocker arms 24 ride upon the cam lobes 20 and engage the intake and exhaust valve stem shafts (not shown) which permit the entrance and exit of the fuel vapor and combustion products exhaust respectively. The valve shafts in the figure are hidden interiorly to valve springs 26.

At the right end of the cam shaft 10 is the cam shaft sprocket 30 which supports the upper end of the timing chain 32. As can be seen in FIG. 1, the timing chain 32 extends downward through a cavity in the engine head 12 where, though not shown in FIG. 1, the timing chain is later engaged by the crank saft sprocket.

Shown also for illustrative purposes in FIG. 1 are the fuel inlet ports 40 as well as the exhaust ports outlet 42. It may also be seen that the top of the engine head is flat with a recessed inner cavity portion, the inner portion containing the shown valve springs 26; and that the cam towers, end towers 14 and central tower 16, are set upon this top flat reference surface. The bottom portion of head 12 (not shown) is a flat surface having indentations inside an outer periphery, the indentations being for the tops of the cylinders, and for the inlet and exhaust valve seats.

When the engine is assembled, a metal gasket, usually aluminum, is placed between the bottom of head 12 and the top of the engine block (not shown). Then the head is secured to the engine block by means of a plurality of machine bolts extending through the head. The top of head 12 is encompassed with a valve cover, nominally made from formed sheet metal, and a soft cork gasket placed between the upper peripherial surface of head 12 and the rim of the valve cover, the valve cover being inverted over the cam shaft-cam tower assembly.

Figure 2:
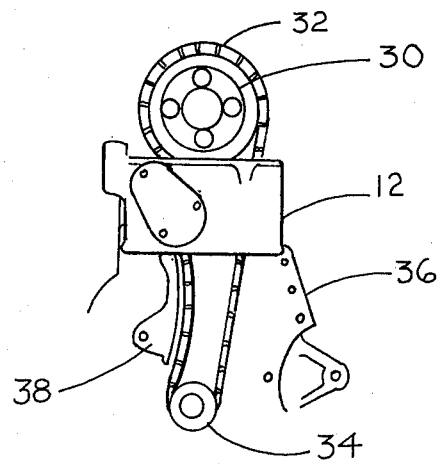
FIG. 2 is an end view of a typical engine showing the cam shaft and crankshaft sprockets and the timing chain.

Referring now to FIG. 2, an end view of a typical engine showing how the timing of the opening and closing of the intake and exhaust valves in relationship to the crankshaft position is achieved. More specifically, cam shaft sprocket 30, which as shown in FIG. 1 attaches to one end of the cam shaft, is surrounded through about ¾ of its periphery by timing chain 32 which extends through the cavity in the engine head 12 to engage the crankshaft sprocket 34 attached to the engine crankshaft. A sufficient length of the crankshaft extends outside engine block 36 to receive the crankshaft sprocket. Rubbing against timing chain 32 is the timing chain friction tension device 38, commonly called a chain tensioner, which is adjustable to take excess slack out of the timing chain to prevent backlash and to assure that the cam shaft maintains a constant angular relationship with the crankshaft.

Figure 3:
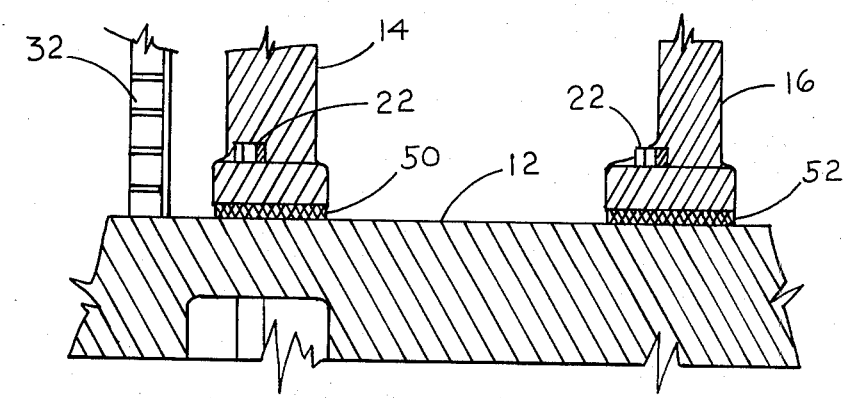
FIG. 3 is an exploded view of a portion of the side view of the engine head showing the invention.

Referring now to FIG. 3, an exploded view of a portion of the side of the engine head of FIG. 1 is detailed. This view is taken from the side opposite as that shown in FIG. 1. More specifically, a portion of end cam tower 14 and central cam tower 16 is illustrated as will as a portion of timing chain 32 which is proximate the end cam tower 14. The top of head 12 is shown but, for purposes of simplicity, the valve springs are not shown. The invention comprising the measured thickness metal shims 50 interposed the bottom of end cam tower 14 and head 12 as well as measured thickness metal shim 52 interposed the central cam tower 16 in head 12 is illustrated. Thus, the effect of the invention shims 50 and 52 are to raise the height of the cam towers a same measured distance above head 12. Cam tower securing bolts 22, which penetrate the cam towers and holes which have been drilled or punched through the shims 50 and 52, reach into and are held in head 12.

Figure 4:
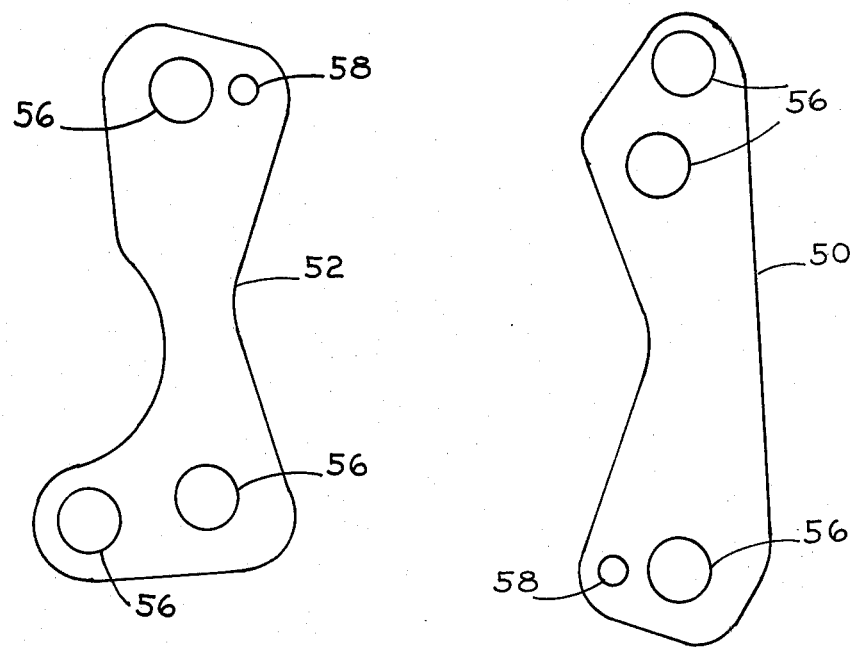
FIG. 4 is a top view of the subject invention.

Reference now to FIG. 4 shows two typical flat metal shims, nominally shim 50 and 52, the end view of which was shown in FIG. 3. Punched or drilled into shim 50 and 52 are the holes 56 to receive the cam tower securing bolts 22 (FIG. 3) as well as oil passageway opening 58. These holes align with similar holes in the cam towers and the head. It is realized of course that there may be universal type shims having more than the shown number of bolt holes and oil passageway openings that may be necessary for any one cam tower, but in fact which may fit a plurality of different cam tower-head junctures. In these cases, the shims still function to serve their purpose of elevating the cam towers, there just being an absence of metal at various points in the area directly beneath the cam tower bottom.

The thicknesses of the shims 50 and 52, which in any single use of the invention will be the same, are determined as hereinafter described.

In operation, the invention which comprises the means and method for reconditioning engines and reusing engine heads which theretofore were previously discarded is as follows. Typically in engines, most notably automobile engines employing overhead cam shafts rotating in cam shaft bearings held by cam towers mounted to the top of the head of the engine, upon overheating of the engine, there exhibits a tendency to warp the heads. This is most especially true in the case of aluminum heads. In most cases the heads will exhibit this warp by twisting or bowing in the longest direction, exhibiting generally a convex bow (when viewed from above). It is noted that this invention applies equally should the head warp in its side to side direction. In any event, when the head bows, it not only bows along its bottom edge, but also along its top edge. Heretofore, the recommendation of most of the repair and machine shops, and in the case of automobiles, the automobile dealer repair shops, is to discard the head and install a new warp free head upon the engine. Then the remainder of the implements mounted on top of the old head are removed and re-installed on the new head.

However, with the herein described invention, these heads may have both surfaces machined, the invention installed, and the engine thereby reconditioned and placed back into operational service.

To recondition the engine, the warp in the head must be removed by machining the lower surface until a planar surface is obtained. This assures that the head will fit properly with the engine block. If however, the repair is stopped here, and many repair shops are guilty of this, the top of the head still remains bowed. If the cam shaft is then placed back into the cam bearings, the cam shaft is not aligned in a straight line but in fact must follow the bowed shape of the upper head surface as dictated by the relative positions of the cam tower. Then, typically, the engine will operate for a short period of time and the cam shaft will fracture.

In accordance with the invention then, the top of the head is also surfaced machined to overcome the bowness of the top. It is obvious that both the bottom surface and the top surface, must be planed so as to be two parallel surfaces. Now that the head is ready for reinstallation upon the engine block, all that must be determined is what total thickness of metal was removed from the head. This may be obtained by one of two methods, either measuring with a micrometer the head thickness before and after the machining operation or by keeping account of the amount each surface was machined and then adding the two thicknesses together.

It has been the experience of the inventor that in most engines it is only necessary to install the inventive shims where a total thickness in excess of 15/1000 to 20/1000 of an inch were machined from the head surfaces. Under that amount, slack tensioning means are usually provided to take up timing chain slack, either by means of idler wheels, or an adjustable friction surface which indents the timing chain along one side between the cam shaft sprocket and the crankshaft sprocket.

It is the case that when an engine head has warped sufficiently that it causes difficulty in the operation of the engine, i.e., water and/or oil leakage between the gasketed surface of the head and the engine block, or leakage of combustion gases out of the cylinder at the engine head-block-gasket junction, about 80% of the heads require machining greater than 20/1000 inch.

Continuing on with the operation of the invention, once the thickness of the shims have been determined, all shims on any one engine being the same thickness, the shims are installed between the bottom of the cam towers and the head. It may be necessary to install a plurality of shims between each cam tower and the head to make up the thickness of the metal removed.

After the shims are installed, the standard measures for utilizing the timing chain tensioner to finally adjust the slackness in the timing chain are performed.

In particular, it is within the inventor's knowledge that the subject invention may be applied to certain engines manufactured by Datsun and Mercedes automobile factories, although there is no intent to limit the invention to the above enumerated engines.

While a preferred embodiment of the invention has been shown and described, it would be understood that there is no intent to limit the invention by such disclosure, but rather, it is intended to cover all modifications and alternate constructions falling within the spirit and the scope of the invention as defined in the appended claims.

I claim:

1. A method of reconditioning engines where the engine head has become warped and distorted, the engine of the type having an overhead cam shaft supported by a plurality of cam towers atop the engine head, the cam shaft having a cam shaft sprocket at one end attached to a crank shaft sprocket in the body of the engine block by a timing chain having a fixed length, a chain tensioner interposed the cam shaft sprocket and the crank shaft sprocket to engage the chain and take up slackness therein within a certain limit, and the distance between the cam shaft sprocket and the crank shaft sprocket being a predetermined fixed length, the method comprising machining the engine head upper and lower surface to coplanar parallel surfaces to remove distortion in the head, selecting a thickness of shim to correspond to the thickness of the metal removed from the engine head upper and lower surfaces, and installing the shim between each of the cam towers and the head whereby the same predetermined fixed distance is maintained between the cam shaft sprocket and the crank shaft sprocket as existed before the head had been planed and the head warped.

2. The method for reconditioning engines as defined in claim 1 wherein the step of selecting a thickness shim includes selecting a thickness of shim equal to the thickness of the metal removed from the engine head upper and lower surfaces less a portion of that certain limit which may be taken up by the chain tensioner.

* * * * *